US006726796B2

(12) United States Patent
Wells et al.

(10) Patent No.: US 6,726,796 B2
(45) Date of Patent: Apr. 27, 2004

(54) PRESSURE SENSITIVE LABELER-LINER ELIMINATOR

(75) Inventors: Jeffrey Leigh Wells, Appleton, WI (US); Steven Michael Wilhelms, Appleton, WI (US); Todd Arlin Schwantes, Lena, WI (US); Mark Wayne Erickson, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 21 days.

(21) Appl. No.: 09/994,047

(22) Filed: Nov. 27, 2001

(65) Prior Publication Data

US 2002/0134500 A1 Sep. 26, 2002

Related U.S. Application Data

(63) Continuation-in-part of application No. 09/816,321, filed on Mar. 26, 2001.

(51) Int. Cl.[7] ............................ B32B 31/00; B55C 9/20

(52) U.S. Cl. ........................ 156/277; 156/289; 156/387; 156/510; 156/DIG. 34

(58) Field of Search ......................... 156/DIG. 34, 256, 156/264, 277, 289, 510, 521, 387; 427/207.1, 208, 208.2, 208.4, 208.6, 208.8

(56) References Cited

U.S. PATENT DOCUMENTS

| | | | | |
|---|---|---|---|---|
| 2,907,682 | A | | 10/1959 | Eichel |
| 3,489,271 | A | | 1/1970 | Tissot |
| 3,663,269 | A | | 5/1972 | Fischer et al. |
| 3,666,597 | A | | 5/1972 | Parnell |
| 3,725,501 | A | | 4/1973 | Hilbelink et al. |
| 3,924,728 | A | | 12/1975 | Brown et al. |
| 3,996,308 | A | | 12/1976 | Douek et al. |
| 4,035,218 | A | * | 7/1977 | Yount ......................... 156/289 |
| 4,080,238 | A | | 3/1978 | Wolinski et al. |
| 4,354,894 | A | | 10/1982 | Lewis et al. |
| 4,544,431 | A | | 10/1985 | King |
| 4,707,211 | A | | 11/1987 | Shibata |
| 4,749,432 | A | | 6/1988 | Ando et al. |
| 4,784,714 | A | | 11/1988 | Shibata |

(List continued on next page.)

OTHER PUBLICATIONS

"Capsules Capture New Markets," Chemical Week, Dec. 21, 1963.

Hartley, "Versatile Capsules: New Packaging Conept of Microencapsulation Wins Many Converts," The Wall Street Journal, Sep. 15, 1965.

Herbig, "Microencapsulation," Encyclopedia of Chemical Technology, vol. 13, Second Edition, 1967, pp. 436–456.

Huber et al., "Capsular Adhesives," Journal of the Technical Association of the Pulp and Paper Industry, vol. 49, No. 5, May 1966.

"NCR and Encapsulation," Applications Research Department, The National Cash Register Company, Dayton Ohio.

*Primary Examiner*—Curtis Mayes
(74) *Attorney, Agent, or Firm*—Birch, Stewart, Kolasch & Birch, LLP

(57) ABSTRACT

A system and method for transporting an adhesive side of a sheet media, particularly a sheet media having an adhesive side with an encapsulated adhesive ruptured by an activator unit. This activation unit can include one or more of the following: a pressure roller, a pair of pressure rollers, an activator blade, a set of rotatable discs or a series of sets of rotatable discs. A sheet media having an encapsulated adhesive is fed past the activator unit in the system and method, whereby the capsules will be ruptured and the adhesive side of the sheet media is activated. A release liner device such as a belt or roll of releasable sheet media transports the activated sheet media throughout subsequent process steps, e.g. label printing, cutting, die casting, etc.

30 Claims, 12 Drawing Sheets

U.S. PATENT DOCUMENTS

| | | | | |
|---|---|---|---|---|
| 4,808,639 | A | | 2/1989 | Chernack |
| 4,961,811 | A | | 10/1990 | Haugwitz |
| 4,980,410 | A | | 12/1990 | Fryd et al. |
| 5,008,133 | A | * | 4/1991 | Herbet et al. |
| 5,178,717 | A | | 1/1993 | Rodriguez |
| 5,277,736 | A | | 1/1994 | Logan |
| 5,443,680 | A | | 8/1995 | Gerber |
| 5,518,576 | A | | 5/1996 | Mendelovich et al. |
| 5,674,345 | A | | 10/1997 | Nash |
| 5,688,363 | A | | 11/1997 | Hinton et al. |
| 5,895,552 | A | | 4/1999 | Matsuguchi |
| 5,897,722 | A | | 4/1999 | Bright |
| 5,985,441 | A | | 11/1999 | Szczepaniec et al. |
| 6,206,071 | B1 | | 3/2001 | Majkrzak et al. |
| 2002/0148556 | A1 | * | 10/2002 | Kawada .................. 156/277 X |

* cited by examiner

PRESSURE SENSITIVE LABELER-LINER ELIMINATOR

CROSS-REFERENCE TO RELATED APPLICATIONS

This application is a continuation-in-part of application Ser. No. 09/816,321 filed on Mar. 26, 2001, the entire contents of which are hereby incorporated by reference.

BACKGROUND OF THE INVENTION

1. Field of the Invention

The present invention relates to a system and method for the handling and transport of a linerless label media through manufacturing, labeling and all related product handling processes. The present invention is more particularly suited for pressure sensitive linerless labeling processes employing an encapsulated adhesive in a sheet media, such as a rupturing adhesive for a roll product.

2. Description of the Background Art

Existing pressure sensitive labelers utilize a media configuration with a pre-coated adhesive label media laminated to a disposable silicone coated liner 5. A labeling system 10' of the background art incorporating an unwinding roll 1 having a pre-coated adhesive label media 6 already laminated to the disposable silicone coated liner 5 is shown in FIG. 1.

The silicone coated liner 5 is used to pull the adhesive label media 6 from the unwinding roll 1 through the labeling system 10' and to a stripper plate 3. A downstream edge of the stripper plate 3 forms an acute angle or tight radius with the path of the adhesive label media 6. As the silicone coated liner 5 is pulled around the downstream edge of the stripper plate 3, the silicon coated liner 5 and adhesive label media 6 delaminate from one another.

The adhesive label media 6 is delivered to the applicator mechanism 2 while the silicone coated liner 5 is directed to a rewind spool 4 through a nip 7 formed by a roller assembly. When the rewind spool 4 is full with the disposable silicone coated liner 5, the full rewind spool 4 is removed and replaced with an empty rewind spool. The full rewind spool 4 can be discarded or the used silicone coated liner 5 can be recycled for later use.

Attempts have been made to produce "linerless" label media that eliminate the necessity for disposable liners such as the silicone coated liner mentioned hereinabove. However, conventional linerless labler systems utilize processes that incorporate costly precautions with respect to equipment contact with the active adhesive side of the adhesive label media.

For instance, conventional linerless labeler equipment must either avoid contact directly with the active adhesive side of the adhesive label media or utilize roller assemblies and plates incorporating expensive, releasable coatings.

Further, it is known to place encapsulated adhesives on a sheet media that can be activated only when desired by the handler or operator. For example, a sheet of paper can have microdots or microlines with an adhesive as disclosed in U.S. Pat. No. 4,961,811. When it is desired to expose this adhesive, the encapsulated adhesive can be ruptured by applying pressure such as from a coin or fingernail. Other encapsulated adhesives are known which can be ruptured by exposure to heat.

However, there exists a need in the art for a system and method for rupturing an adhesive in a sheet media, which can work on a large scale and that can be handled effectively upon being activated. In other words, a system and method for mass producing a series of sheets which have their encapsulated adhesives ruptured are needed. Such a system and method can be used to supply ready to adhere labels for products. Other uses are also contemplated. Such a system and method should be reliable, low in cost, and require little maintenance.

SUMMARY OF THE INVENTION

Accordingly, it is an object of the invention to provide a system that can reliably rupture encapsulated adhesives contained in a sheet media.

A further object of the invention is to provide a method for reliably rupturing encapsulated adhesives contained in a sheet media.

It is a further object of the invention to provide such a system and method that can be used on a large scale to quickly provide application-ready labels and other adherable products.

It is a further object to provide a system and method for handling and transporting of a linerless label media.

It is a further object to provide a system and method particularly suited for pressure sensitive linerless labeling processes employing an encapsulated adhesive in a sheet media that can be ruptured reliably during any manufacturing process for a roll product.

It is another object of this invention is to provide a low cost and low maintenance system and method.

These and other objects of the present invention are accomplished by a system for handling an adhesive coated sheet media, comprising a feeder for the sheet media, an activation device for releasing an encapsulated adhesive as sheet media is moved past the activation device by the feeder; and a release liner device for laminating with at least one adhesive side of the sheet media and transporting the sheet media through a travel path.

Additionally, these and other objects of the present invention are accomplished by a method for transporting a sheet media having an at least one adhesive side, comprising the steps of providing a sheet media having the at least one adhesive side; feeding the sheet media along a travel path; passing the sheet media against an activation device; rupturing the encapsulated adhesive as the sheet media moves past the activation device; laminating the at least one adhesive side of the sheet media with a release liner device; and transporting the sheet media to a subsequent process step with said release liner device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
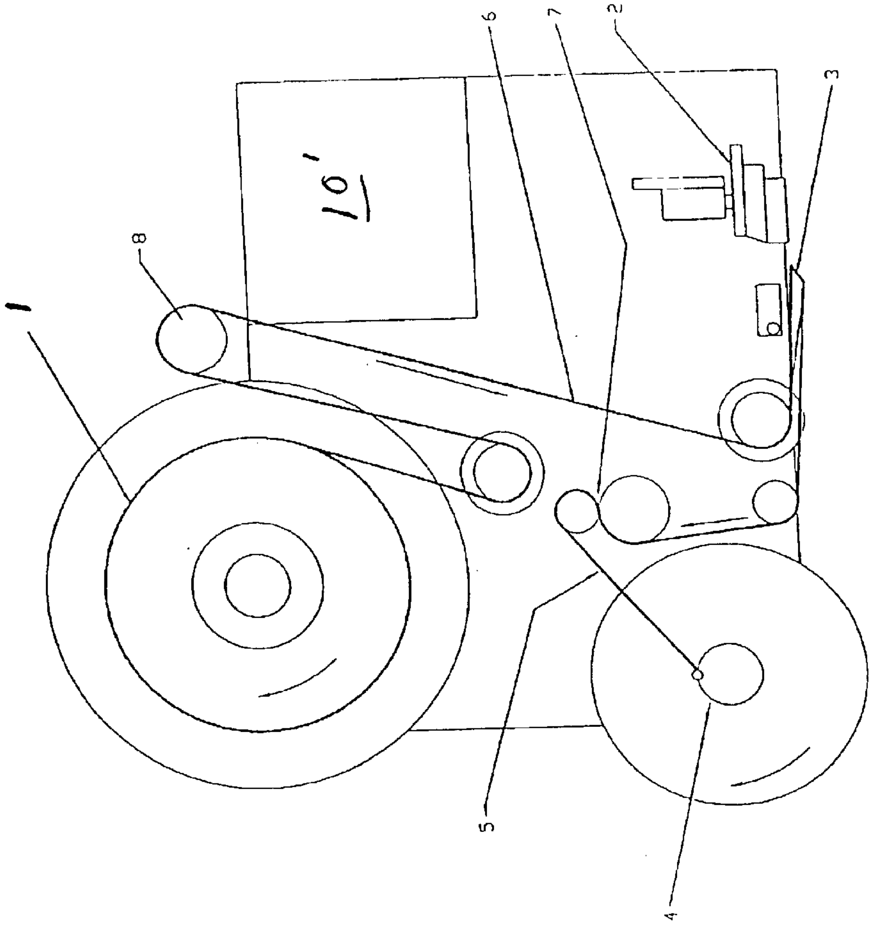
FIG. 1 BACKGROUND ART
FIG. 1 is a schematic view of a pressure sensitive labeler system of the background art.
Figure 2:
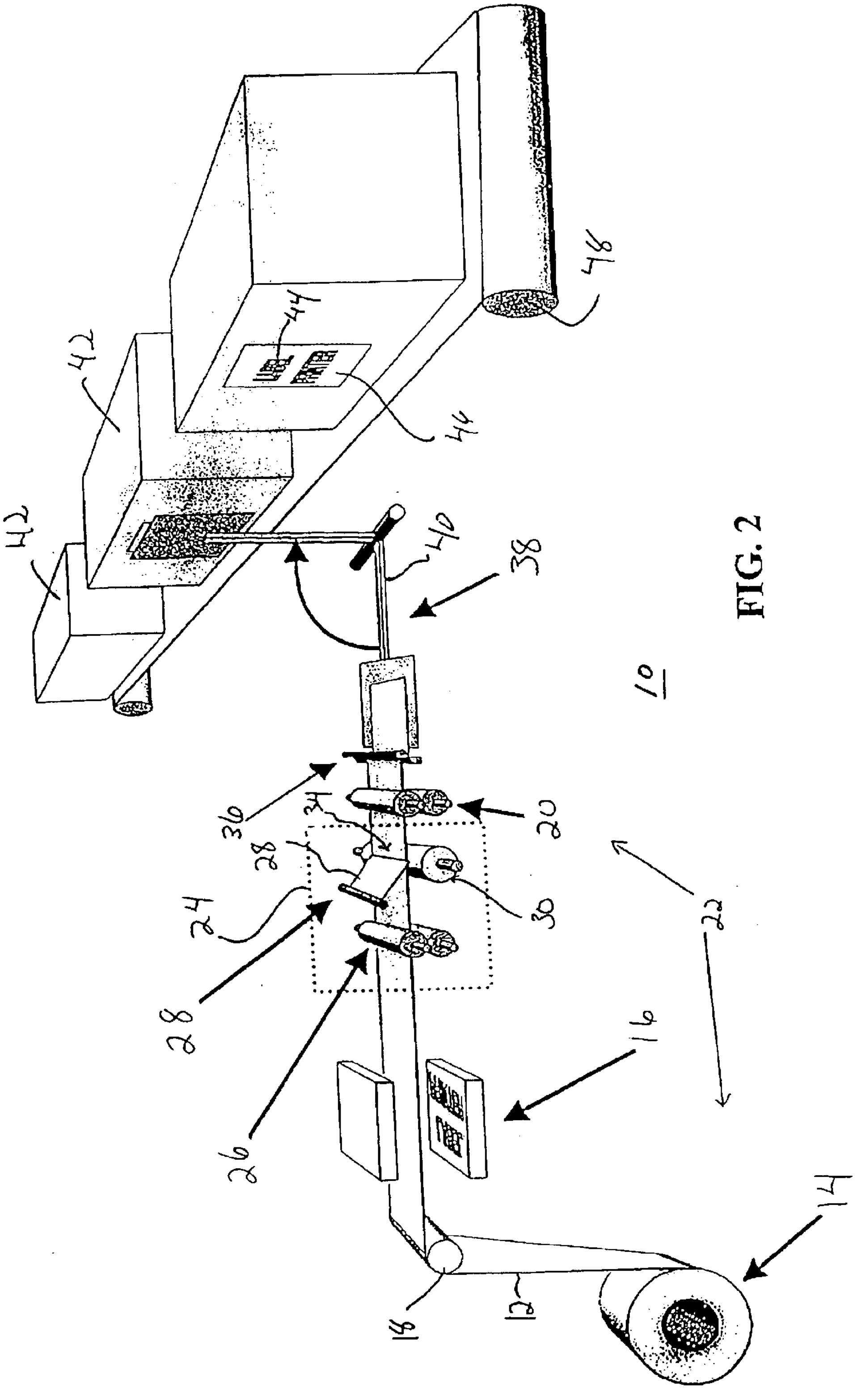
FIG. 2 is a schematic view of an encapsulated adhesive rupturing system of the present invention.

Referring in detail to the drawings and with particular reference to FIG. 2, a labeling system 10 for rupturing an encapsulated adhesive contained in a sheet media 12 is disclosed. While a web 14 of sheet media is disclosed, it should be understood that any form of media could be used. For example, a supply of individual sheets could instead be used. Moreover, many different types of sheet media can be used. For example, paper, metal foil, plastic sheets or any other desired sheet could be used.

Downstream from the web 14, a label printer 16 is provided. This printer 16 will place indicia on the sheet media. Of course, this printer 16 could be omitted or respositioned, and/or the indicia preprinted on the sheet media if so desired. A roller 18 is shown between web 14 and printer 16. This roller diverts the direction of movement of the sheet media While not shown, some motor or other driver can be used for unwinding and/or moving the sheet media 12 through the system 10. The web 14 and driver rollers 20 are contemplated as being a part of the feeder 22 of the system 10. While a pair of drive rollers 20 on opposite sides of the sheet media have been shown, the form and positioning of this drive could of course be varied.

Upstream from drive rollers 22, an activation unit 24 is shown. In this embodiment, the activation unit 24 includes a pair of pressure or crushing rollers 26, an activator blade 28 and a support surface 30. The activation unit 24 is not limited to these elements, but in a preferred embodiment the activation unit 24 will at least include the activator blade 28 and the crushing rollers 26.

By using both the pressure rollers 26 and activation blade 28, it can be ensured that the encapsulated adhesives contained in the sheet media 12 are ruptured. It is contemplated that the majority of rupturing of the encapsulated adhesives will be accomplished by the pressure rollers 26. However, in the first embodiment, some rupturing of the adhesives can also be carried out via the activator blade 28. Apart from rupturing any remaining unruptured encapsulated adhesives, this activator blade 28 serves to spread the adhesives around the sheet media 12. This will help adherence of the label or the product prepared from the sheet media, as will be discussed below.

It is also contemplated that, instead of using the pressure rollers 26 the activator blade 28 could instead be used alone. The force exerted by the activator blade would be greater than the force used when both pressure rollers 26 and an activator blade 28 are used. Nonetheless, it is contemplated that an activator blade alone could be used. However, it is important that the pressure exerted by this activator blade not be so great as to mar the sheet media. In addition, instead of a single blade 28, a series of blades could be used.

Figure 3:
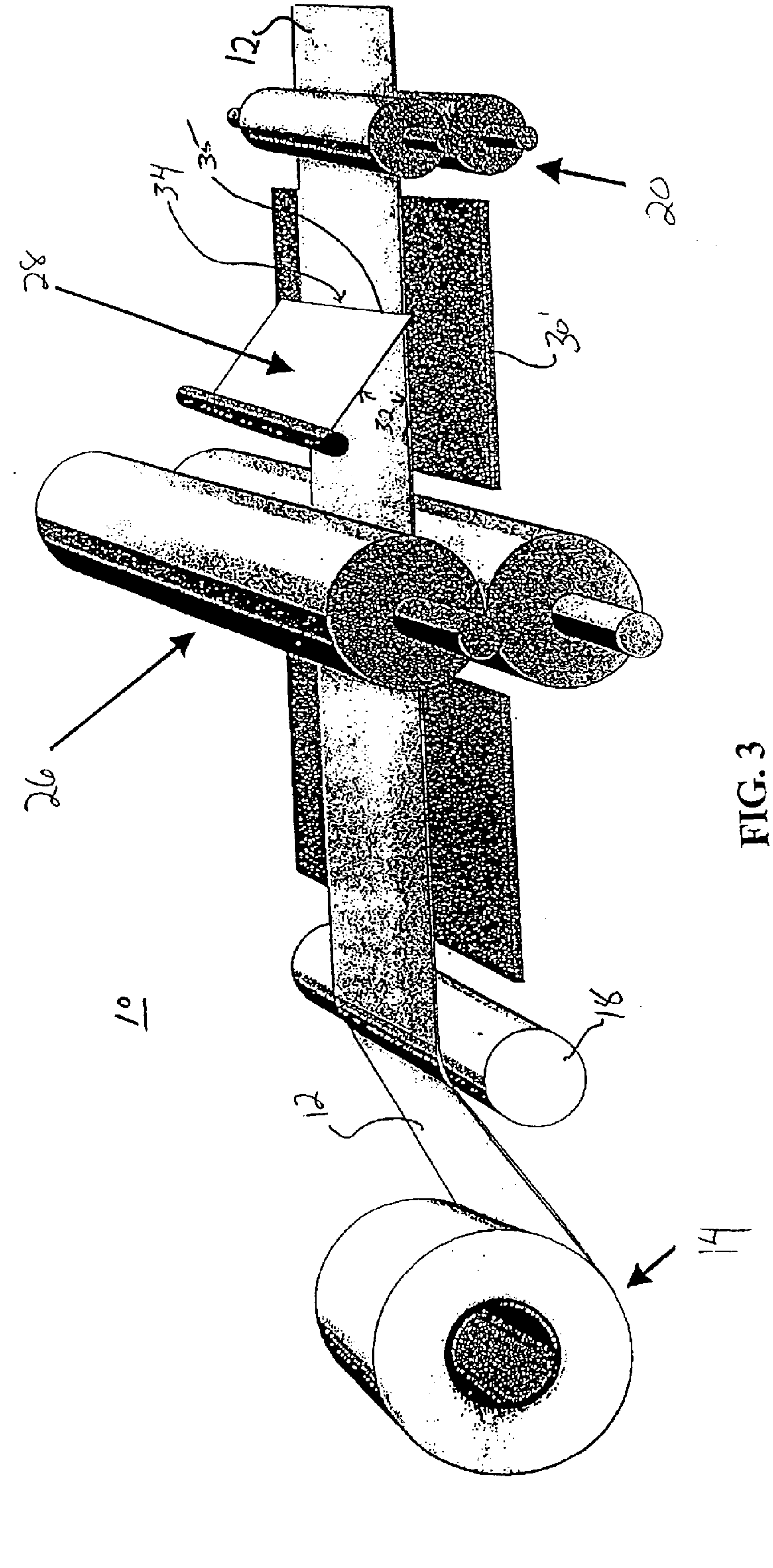
FIG. 3 is an enlarged view of a portion of the system of FIG. 1 according to the present invention.

As seen in the drawings, this blade 28 extends across the width of the sheet media and forms an acute angle 32 with an upstream position of the sheet media 12 as seen also in FIG. 2. It should be noted in FIG. 3 that the support surface 30' is a flat surface instead of the roller 30 shown in FIG. 2. Other surfaces could be used as desired. The sheet media 12 will move along a travel path 34 that is adjacent crushing rollers 26 and activator blade 28. As the sheet media passes through the activation unit 24, the microencapsulated adhesive in the sheet media 12 will be ruptured. Any type of suitable adhesive can be used in the sheet media.

The adhesives may be classified according to the mode of reactivation, by the extent of encapsulation, chemical composition, whether solvent-based, or reactive or curable. The entire adhesive can be encapsulated or a component could be encapsulated. Solvent-based systems are reactivated by applying pressure and releasing the capsule contents to tackify the adhesive. Adhesives such as polyvinyl acetate, rubber, nitrile rubber, ethylcellulose, or other cellulose derivatives such as cellulose acetate lend themselves to solvent reactivation. While the capsules are intact, the coating is dry to the touch. The coating is tackified upon rupture and release of the solvent. Such systems are taught for example in U.S. Pat. No. 2,907,682. Reactive resins can also be encapsulated. These could include materials such as epoxy, isocyanates, polyesters, polyacrylates, glycidyl acrylates, acrylic nitrile and methacrylates with curing agents such as azo initators, benzoyl peroxide, acid chorides or cross linking agents such as melamine formaldehyde and other materials.

The capsules can be assembled with the curing agents adhered to the outside of the capsule wall or adhered to the surface upon which the capsules are adhered. Examples of various adhesive systems include U.S. Pat. Nos. 3,996,308, 4,980,410, 4,808,639 and 3,725,501. More recently, encapsulated adhesives have been developed that form in situ in the microcapsules during the capsule formation process. These adhesives are based on acrylate or methacrylate type monomers. Such capsules for example are taught in U.S. Provisional Application No. 60/230,365 filed Sep. 6, 2000, the entire contents of which are hereby incorporated by reference. These adhesives are also dry to the touch. Upon capsule rupture, the tacky adhesive in the capsules is made available for bonding. The in situ microencapsulated adhesives, although preferred, should not be viewed as limiting of the device of the invention which can be utilized with the various microencapsulated adhesives.

The activator blade 28 is at a fixed position relative to travel path 34 as well as relative to a point on the support surfaces 30 and 30'. While roller 30 may be rotatable, the blade 28 is nonetheless at a fixed location relative to an axis of the roller. Of course, this roller 30 could also be non-rotatable if so desired.

The activator blade 28 is shown extending across all of the width of the sheet media 12 and is shown as having a linear edge 35. Of course, this blade could be only across half or a majority of the sheet. In fact, the blade 28 could only extend along a small width of the sheet media or could form some pattern across the width of the sheet media, for example, a comb-like, saw toothed pattern or curved pattern. Alternatively, the activator blade 28 could have staggered contact points with the sheet media. For example, if the blade 28 had a comb-like pattern, some teeth could be positioned further upstream or downstream relative to other teeth. Any number of patterns and placements could be had for the point or points of contact of the blade 28 with the sheet media 12. Nonetheless, this blade 28 should be at a fixed position to enable uniform, constant rupturing of the adhesive if it is used with crushing rollers 26.

If, however, a label is to be formed and adhesive is not needed at the periphery of the label, some reciprocating mechanism can be provided to repeatedly engage and disengage at least one of the rollers 26 and the blade 28 with the sheet 12 to form the desired pattern of ruptured encapsulated adhesive. It should therefore be appreciated that a great variety of designs or patterns can be formed with the ruptured adhesives, but the system 10 nonetheless enables mass production of ruptured adhesives on sheet material.

The crushing rollers 26 and activator blade 28 each exert a uniform pressure on the sheet media 12 in order to rupture encapsulated adhesive on the sheet media. The pressure applied is sufficient to break the capsules without damaging the sheet media. No wastes or adhesives build up at the activator blade 28 so that is does not need to act as a doctor blade. Continual long-term running of the system 10 is therefore possible. Not only will the blade 28 shear off the tops of unruptured adhesive capsules, but it will also spread or smear the adhesives on the sheet media 12.

Downstream from activation unit 24 and drive rollers 20, a cutter 36 is provided as shown in FIG. 2. This cutter 36 can be a reciprocable cutting blade or a roller with a cutting blade or any other suitable cutter. The cutter 36 can completely sever the sheet or can only partially cut or perforate the sheet as desired. In the embodiment shown, the cutter 36 is provided on both sides of the sheet media 12, but it could include a blade or knife only on one side of the sheet if so desired. If sheets are being fed through the system rather than a web of material, this cutter 36 can be omitted or simply shut off.

A label applicator 38 is then provided downstream from the cutter 36. This applicator includes a pivoting arm 40 for applying labels to a side of boxes 42 as shown in FIG. 2. These labels include the severed sheet media with indicia 44 on one side and adhesive on the other side. The adhesive adheres the label 46 to the box 42.

The boxes 42 are fed along conveyor 48. A suitable control means (not shown) is provided for timing and controlling the overall operation of the system 10.

Figure 4:
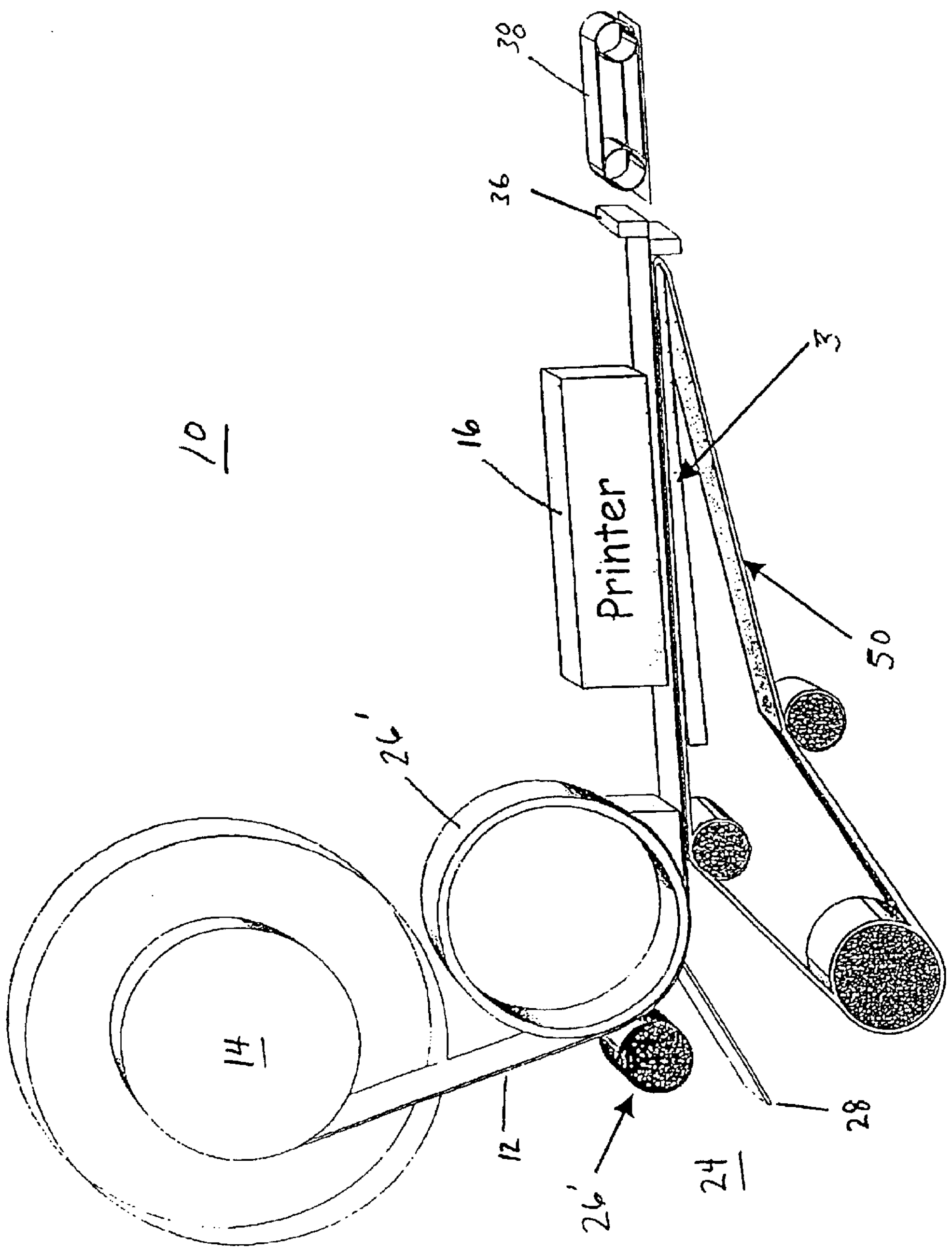
FIG. 4 is a schematic view of a linerless label system according to an embodiment of the present invention.

FIG. 4 is a schematic view of a linerless label system according to an embodiment of the present invention. The pre-coated encapsulated adhesive label media 12 is pulled or driven from the web 14. Although an encapsulated sheet label media 12 is preferred and shown in FIG. 4, the sheet media 12 can be any type of linerless label media that is available in the related art.

A roller assembly either drives or pulls the adhesive label media 12 through an activation unit 24, e.g. a pair of crushing rollers 26' and past an activation blade 28. At this point, the label media 12 is "active" since the encapsulated adhesive has been ruptured by the activation blade 28 and crushing rollers 26'. Although an activation blade 28 and crushing rollers 26' is shown in FIG. 4, any of the activation units 24 described hereinabove can be utilized.

A release liner device 50 is provided in an opposed fashion to a printer assembly 16. The activated adhesive side of the label media 12 becomes laminated or joined with the release liner device 50 after leaving the activation unit 24. The activated label media 12 is transported and held by the release liner device 50 in a stable position during subsequent printing operations. Upon leaving the printer assembly 16, the activated label media 12 is separated from the release liner device 50 by any suitable delamination process, e.g. a stripper plate 3. The activated label media 12 can then be passed to the subsequent manufacturing process, e.g. a cutter 36 and a label 38 activator.

Although a printer assembly is shown in FIG. 4, any required process step can be included in the position opposed to the release liner device 50 and occupied by the printer 16, e.g. coating, die cutting, heat treatment, etc. The release liner device 50 can be any type of continuous feed belt (shown in FIG. 4) or web of non-stick material that is specially treated with a coated or treated surface that does not permanently adhere to the activated adhesive side of the label media 12.

Examples of these coated or treated surfaces are well known in the related art; specifically non-stick surfaces such as polished metal, polytetrafluoroethylene, or silicone can be applied to a releasable surface of the release liner device 50, e.g. a belt having a releasable surface formed from one of the aforementioned coatings or their equivalents is possible. Further, U.S. Pat. Nos. 5,674,345 and 5,895,552 describe several applicable examples of appropriate non-stick surfaces and coatings for the labeling system of the present invention, the entirety of each of which are herein incorporated by reference.

Figure 5:
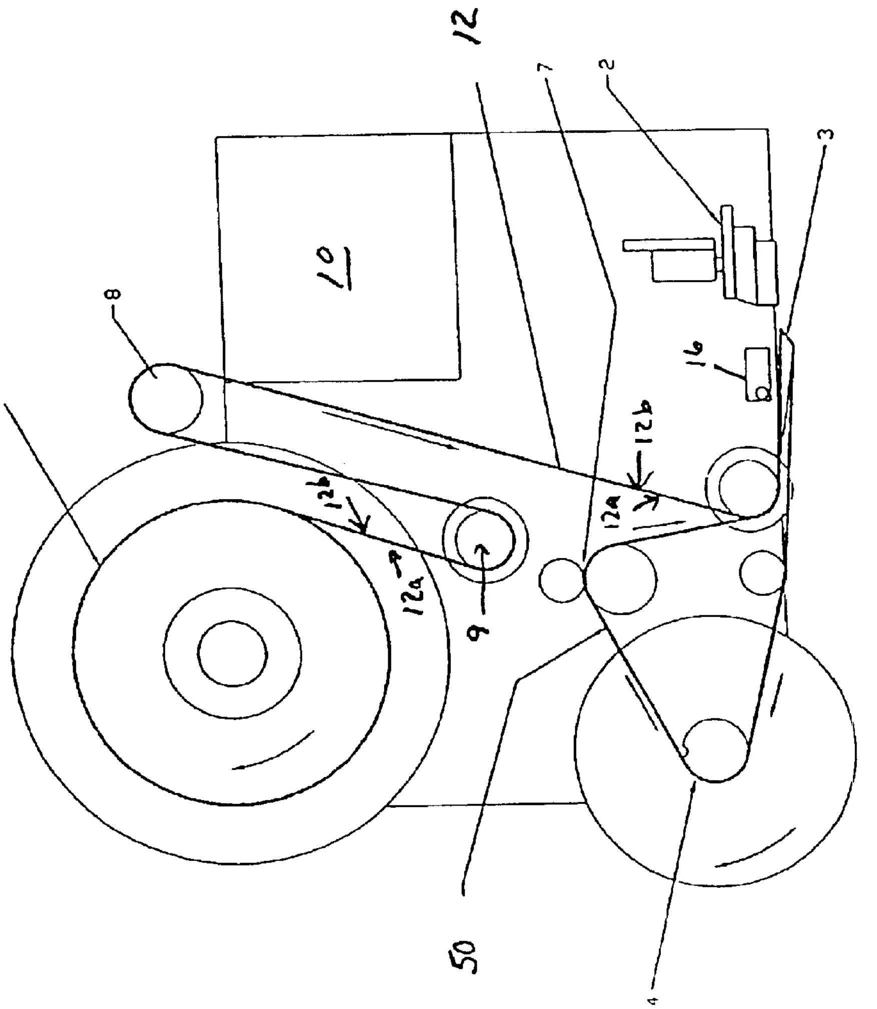
FIG. 5 is a schematic view of a linerless label system according to an embodiment of the present invention.

FIG. 5 is a schematic view of a linerless label system according to an embodiment of the present invention. As aforementioned, the label media 12 does not have to include an encapsulated adhesive as shown in FIG. 4. Instead, the release liner device 50 can be used in conjunction with linerless label media pre-coated with activated adhesive. An unwinding roll 1 of label media 12 pre-coated with adhesive on at least one adhesive side 12*a* is shown in FIG. 5. The opposite surface of the label media 12 is coated with some sort of non-stick material to form a non-stick or non-adhesive side 12*b* of the label media. The non-adhesive side 12*b* of the label media is necessary to prevent the unwinding roll 1 of label media from forming an inseparable mass of label media 12, e.g. like a hard hockey puck, that bonds to itself during prolonged periods of inactivity or storage such as might happen with traditional masking or Scotch™ tape.

The pre-coated adhesive linerless label media 12 is pulled from the unwinding roll 1 by a series of driven rollers 8, and 9. The adhesive side 12*a* of the label media 12 is laminated with the release liner device 50. The release liner device 50, driven by a driven roller 4 and nip rollers 7, transports and ensures stable and accurate positioning of the label media's non-adhesive side 12*b* in opposition to the printer assembly 16. A stripper plate 3 then delaminates the release liner device 50 from the adhesive side 12*a* of the label media and the label media continues onto a subsequent manufacturing process, e.g. an applicator mechanism 2.

Figure 6:
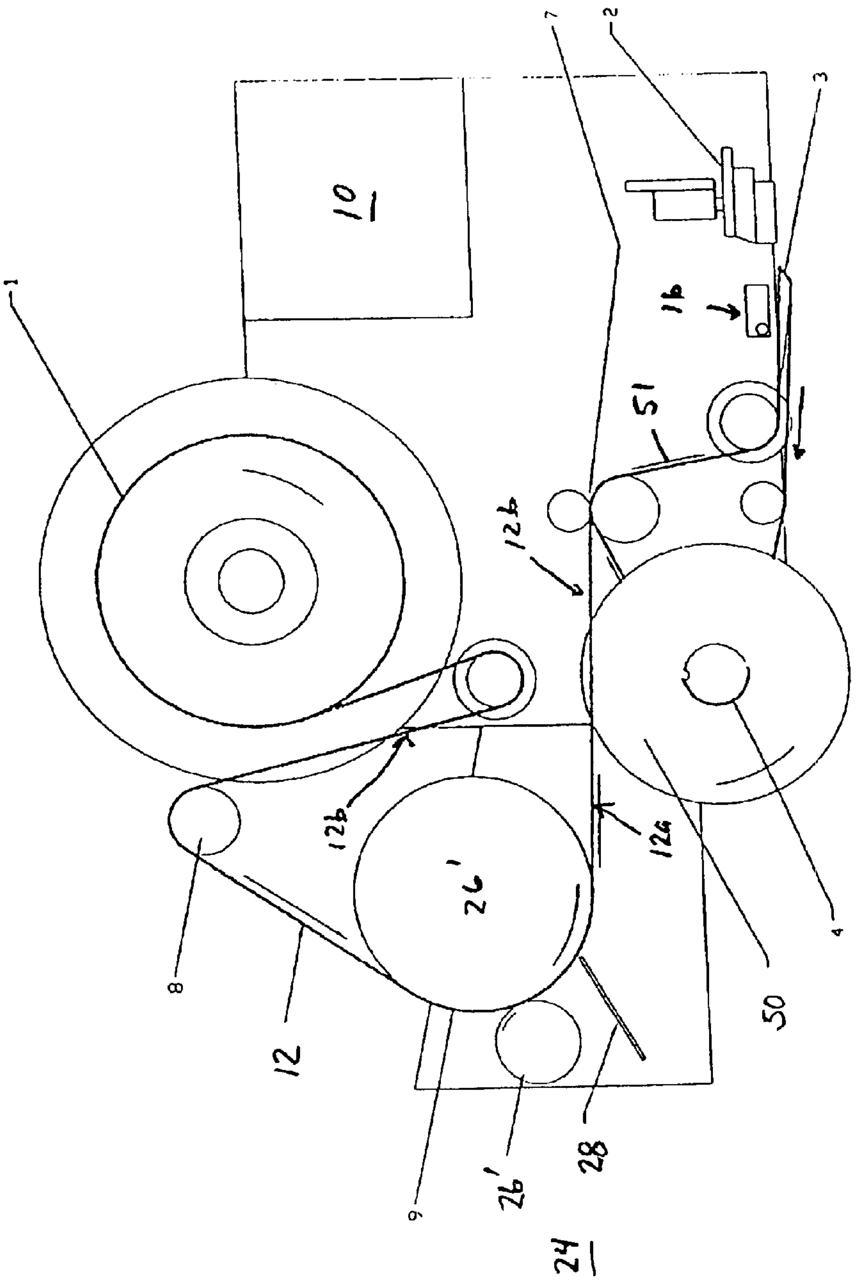
FIG. 6 is a schematic view of a linerless label system incorporating an encapsulated adhesive label media and a release liner device according to an embodiment of the present invention.

An alternative embodiment to that shown in FIG. 5 is shown in FIG. 6. FIG. 6 is a schematic view of a linerless label system incorporating an encapsulated adhesive label media 12 and a release liner device 50 according to an embodiment of the present invention. A description of elements common to FIG. 4 through FIG. 6 and sharing common element numbers will not be repeated hereinafter.

In slight contrast to the embodiment shown in FIG. 4, the release liner device 50 of FIG. 6 takes the form of a roll(s) of coated sheet media 51 mounted on a drive roller 4. The release liner device's sheet media 51 has a surface for laminating with the adhesive side 12*a* of an encapsulated adhesive label media 12.

The release liner device 50 is provided in an opposed fashion to a printer assembly 16. The activated adhesive side 12*a* of the label media 12 becomes laminated or joined with the release liner device's 50 sheet media 51 after leaving the activation unit 24. The activated label media 12 is transported and held by the release liner device 50 in a stable position during subsequent printing operations. Upon leaving the printer assembly 16, the activated label media 12 is separated from the release liner device 50 by any suitable delamination process, e.g. a stripper plate 3. The activated label media 12 can then be passed to the subsequent manufacturing process, e.g. a cutter 36 and a label 38 activator. The sheet media 51 of the release liner device 50 can then be captured on a recycle roll (not shown) for later use or disposal.

Figure 8:
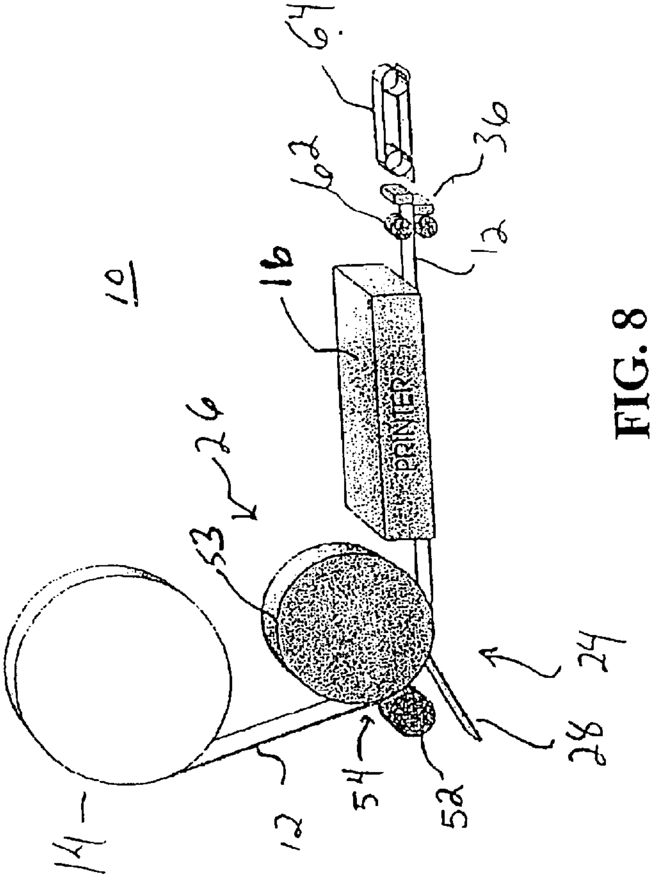
FIG. 8 is a schematic view of an embodiment of the system of the present invention.
Figure 7:
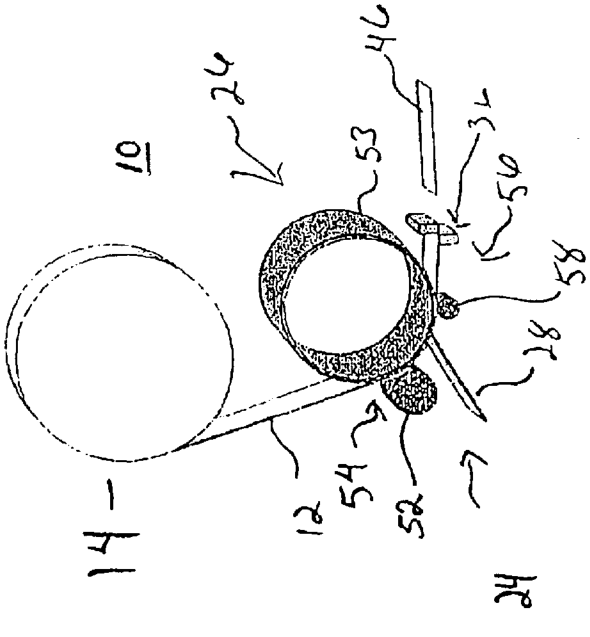
FIG. 7 is a schematic view of an embodiment of the system of the present invention.

Turning now to FIG. 7 and FIG. 8, alternative embodiments of the labeling system 10 of the present invention are shown. In these embodiments, a web 14 of sheet material 12 is provided. As with the embodiment of FIG. 3, a motor or other suitable drive can be utilized to unwind the sheet material 12 from the web. The activation unit 24 includes a pair of crushing rollers 26.

Unlike the first embodiment, the crushing rollers shown in FIG. 7 are of different sizes. In particular there is a smaller first crushing roller 52 and a larger second crushing roller 53. Between these crushing rollers, a crushing nip 54 is formed. While the larger second roller 53 is shown as being hollow, this is merely a schematic showing. This roller 53 can be hollow or can be solid as desired. Moreover, the exact sizes of the rollers 26 can be varied as desired. Nonetheless, these rollers 52, 54 will place a suitable pressure on the sheet media 12 in order to rupture the encapsulated adhesive.

The activator blade 28 can smear or spread the adhesives. If so desired, a sufficient pressure can be provided by this activator blade 28 such that the encapsulated adhesives which are not ruptured by the crushing rollers 26 will be ruptured by blade 28. The activator blade 28 can sever the encapsulated adhesives or can provide sufficient force to crush the non-ruptured adhesives.

Downstream from the activator blade 28 is a drive nip 56. A roller 58 and the second crushing roller 52 will form this drive nip. The second crushing roller 52 and/or the roller 58 can be powered in order to feed the sheet media 12 through the system. A drive for unwinding web 14 can be omitted if so desired. Other drives, apart from nip 56, can be utilized if so desired. Since the adhesive will be activated downstream from the activator blade 28, the roller 58 can be coated in order to avoid adhesives adhering thereto.

Downstream from the drive nip 56 is a cutter 36. The comments made with regard to the cutter 36 in the first embodiment are equally applicable to the cutter used in this and subsequent embodiments. The cutter 36 will sever the sheet media 12 in order to form individual sheets. The web 14 of sheet media can have preprinted labels. Therefore, upon severing by the cutter 36, a label 46 will be formed by the individual sheets. While not shown, this second embodiment as well as other embodiments can have a label applicator 38. This applicator 38 can include a pivoting arm 40 for adhering the labels to boxes or other items. Conveyors, skids or other suitable devices for infeeding or outfeeding the items for labeling can also be utilized.

Turning now to FIG. 8, another of the system 10 is shown. Similarly to the previously described embodiments, a web 14 of sheet material 12 is provided. Unlike the arrangement in FIG. 7, it is contemplated that the sheet media 12 in web 14 will not be preprinted.

Therefore, a downstream printer assembly 16 is utilized. However, this positioning of the printer in FIG. 8 differs from the printer 16 of FIG. 2. It should be appreciated that the printer 16 could be positioned upstream and/or downstream from the activation unit 24 as desired.

While a roller 58 is not shown in FIG. 8 adjacent the second crushing roller 52, such a roller could be utilized if so desired. Any suitable drive for feeding the sheet media 12 through the system can be utilized.

Downstream from the printer 16 are a pair of guide rollers 62. These rollers 62 guide the sheet media to the cutter 36. From the cutter 36, a discharger 64 is shown. This discharger 64 can include a powered conveyor belt that will feed the severed labels from the cutter to the downstream location. As has been noted above, a label applicator and/or other suitable handling device can be provided.

Figure 9:
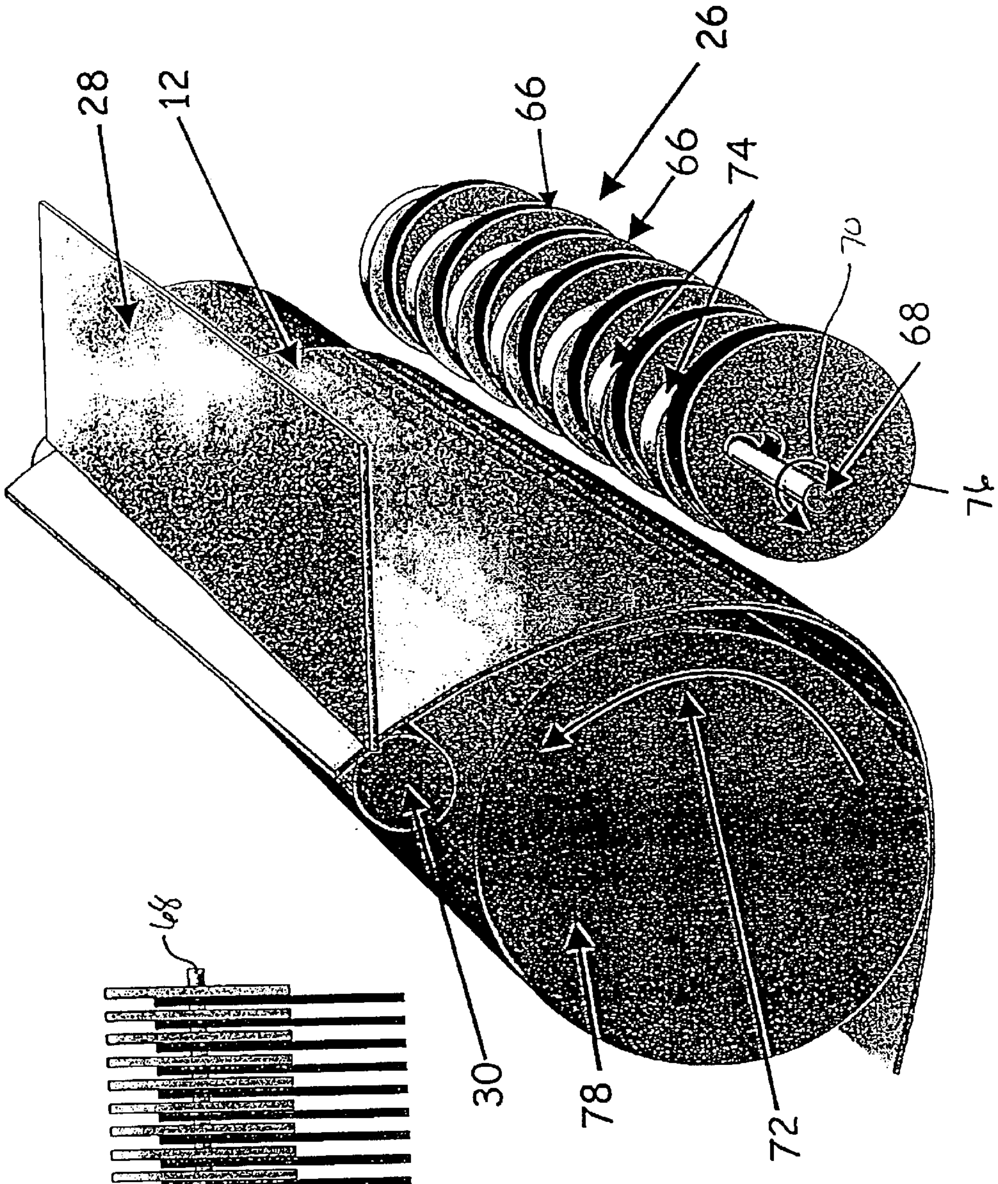
FIG. 9 is a side view of a set of crushing rollers shown in a rest position.
Figure 10:
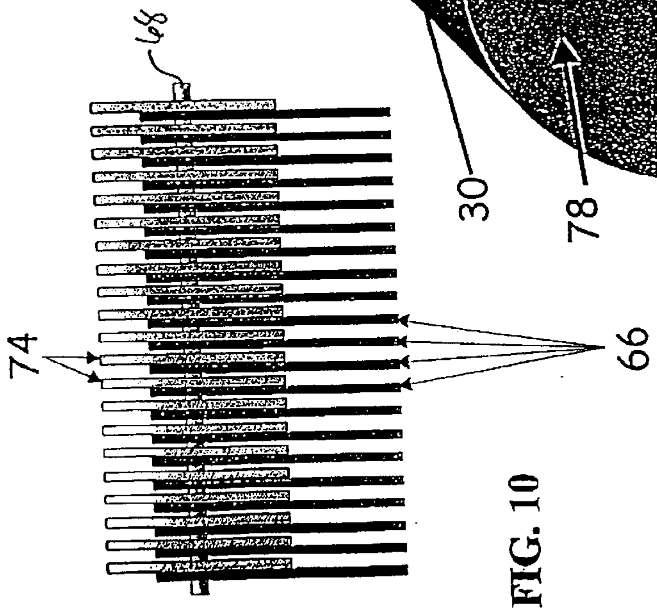
FIG. 10 is a plan view of a set of crushing rollers used in an embodiment of the present invention.
Figure 11:
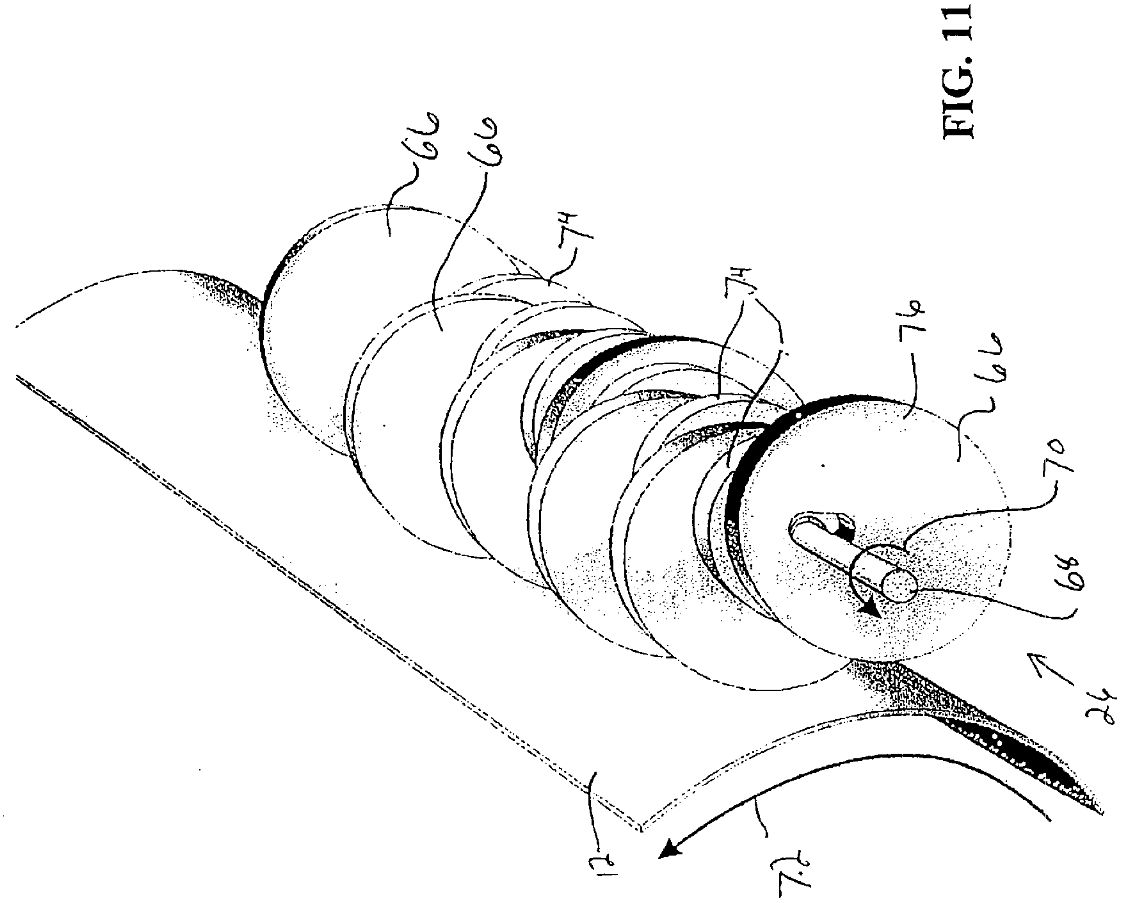
FIG. 11 is a perspective view of the set of crushing rollers of the embodiment as shown in FIG. 10.

Turning now to the embodiment shown in FIGS. 9–11, a plurality of discs 66 are utilized. FIG. 9 is a side view of a set of crushing rollers shown in a rest position. FIG. 10 is a plan view of a set of crushing rollers used in an embodiment of the present invention. FIG. 11 is a perspective view of the set of crushing rollers of the embodiment as shown in FIG. 10. The discs 66 are rotatable on axle 68 in a counterclockwise direction as indicated by the arrow 70 shown in FIG. 9.

While a counterclockwise rotation is indicated, a clockwise rotation could also be utilized. A suitable motor is provided for driving the axle 68. As the axle 68 rotates, frictional engagement will cause the disc 66 to rotate. As seen in FIG. 9, these discs are eccentrically mounted such that they rotate in a non-uniform manner about the axle 68. This provides for different contact positions of the discs 66 along a width and length of the sheet media 12. The sheet media is fed in the direction indicated by arrow 72. Of course, the sheet media 12 could be fed in the opposite direction. While not shown, a backing roller, backing surface or other suitable device can be provided such that the sheet media 12 moves between this surface and the rotating discs 66.

Upon contact with the sheet media 12, the discs 66 will rupture the encapsulated adhesive. In this manner, a dispersed arrangement of released adhesives are provided on the sheet media 12.

Between the various discs 66, spacers 74 are provided. Any suitably sized spacers and discs can be used. It is contemplated that the spacers 74 will not be eccentrically mounted on the axle 68. However, such eccentric mounting could also be carried out. The discs 66 will frictionally engage the rotating axle 68 in order to undergo rotation. Upon stopping of rotation of the axle 68, the discs 66 will fall by gravity to a rest position 76. This position is shown in both FIGS. 9 and 11.

In this rest position 76, the discs 66 are out of contact with the sheet media 12. Therefore, when the system of the present invention is shut off, the discs will move out of contact with the sheet media 12. Therefore, the ruptured adhesive will not have a chance to set up and adhere to the discs if the system is shut down for a long period of time.

While frictional engagement between the discs 66 and the axle 68 is contemplated, any other suitable arrangement can be had. For example, gearing or other known connectors may be provided. Moreover, the discs 66 may be permanently affixed to the axle 68 and a driver or other means can be provided in order to move the axle and its discs 66 away from the sheet media 12 when the system is turned off. Nonetheless, a less complicated arrangement is provided by the design shown in FIG. 9. As noted above, when the system is shut down, the discs 66 will simply fall by gravity into their rest position 76. In this rest position 76, the discs 66 as well as the spacers 74 are spaced from and out of contact with the sheet media 12.

Figure 12:
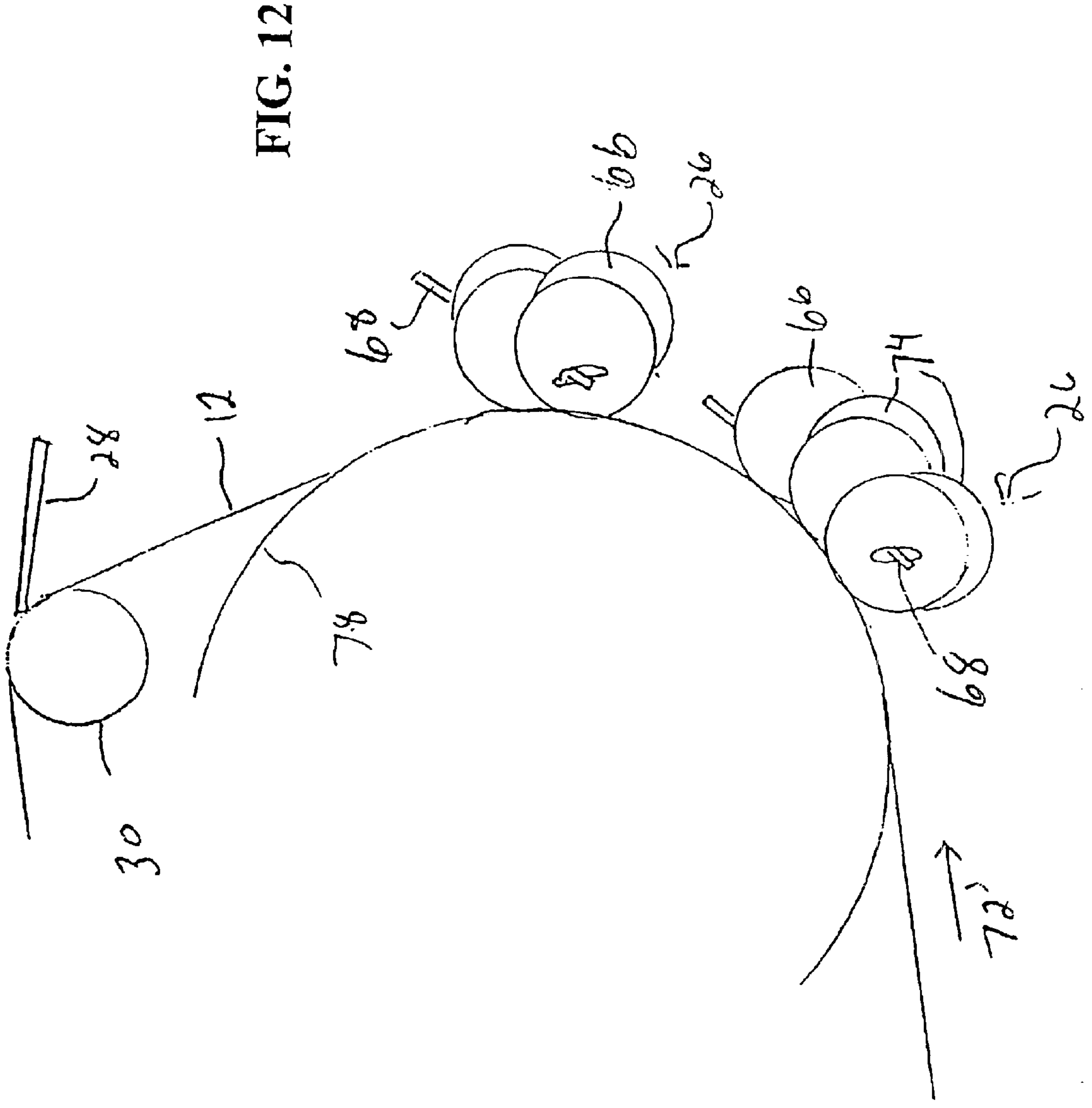
FIG. 12 is a schematic view showing a series of sets of crushing rollers used in an embodiment of the present invention.

Turning now to FIG. 12, a system similar to that shown in FIGS. 9–11 is also shown. In this system, two sets of crushing rollers 26 are provided. In particular, an axle 68 with the plurality of discs 66 and spacers 74 are provided in each set of crushing rollers 26. Similarly to the embodiment of FIG. 10, these discs 66 are eccentrically mounted and upon rotation of the different axles 68, the discs will spin in order to engage the sheet media. This engagement will rupture the encapsulated adhesives.

The two sets of crushing rollers 26 are spaced and timed such that a greater amount of encapsulated adhesives are ruptured than is accomplished in the embodiment of FIGS. 9–11. In fact, more than two sets of crushing rollers 26 can be provided. The set of crushing rollers 26 can be timed and spaced such that the complete width or a majority of the width of the sheet media 12 have the encapsulated adhesives ruptured. Skewing the axle 68 relative to the travel path of the sheet media 12 will also help eliminate inactivated sections/lines of adhesive (and can eliminate the need for a second set of activator discs as will be discussed below). This skewing would affect the motion of the disc 66 and would require a “flatter” backing surface or longer radius roller.

In FIG. 12, an activator blade 28 is shown downstream from the crushing rollers 26. While such an activator blade is not shown in the early embodiments of FIGS. 9–11, it is contemplated that it can be included, if so desired. A separate support surface 30 is utilized in FIG. 12. If so desired, the activator blade 28 can engage the sheet media 12 when the sheet media is on the support 78. This support 78 supports the sheet media 12 as it moves past the sets of crushing rollers 26. It is contemplated that, upon termination of rotation of the axles 68, the discs 66 will fall to the rest position 76 by gravity.

Figure 13:
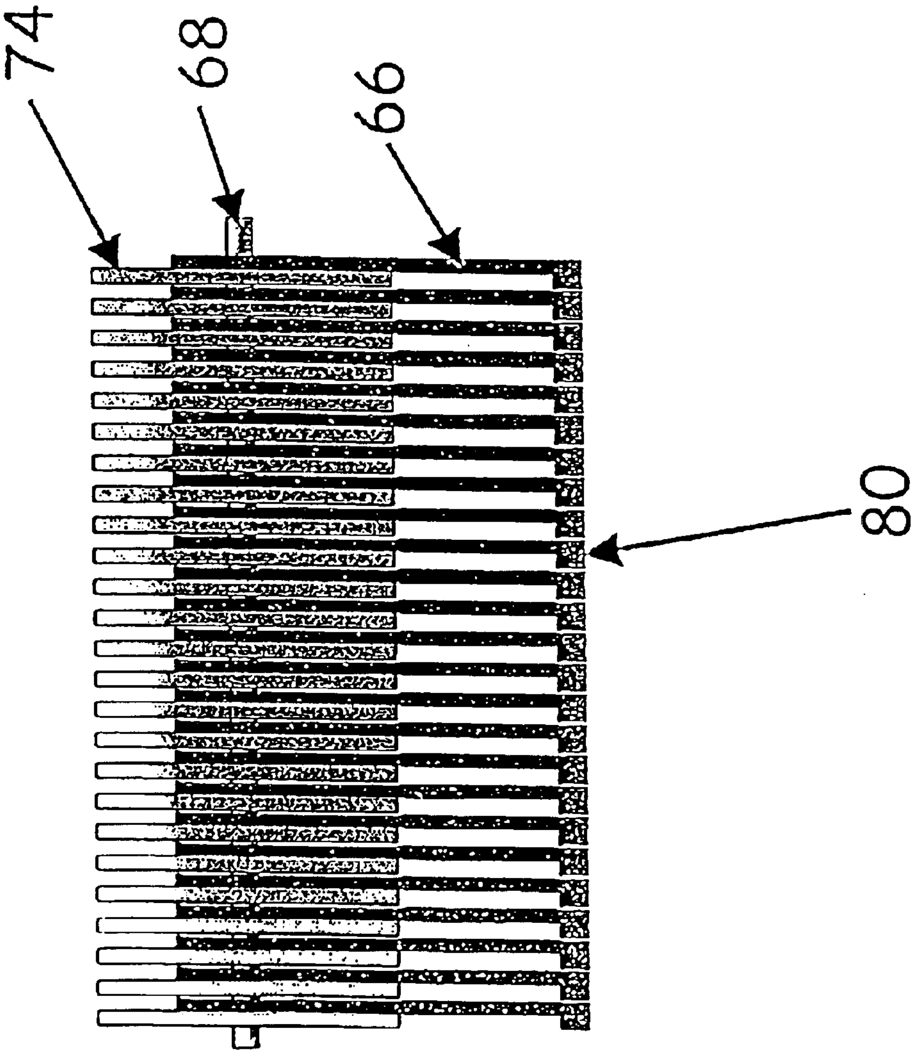
FIG. 13 is a side view of a set of crushing rollers of an embodiment of a disc having a widened edge.
Figure 14:
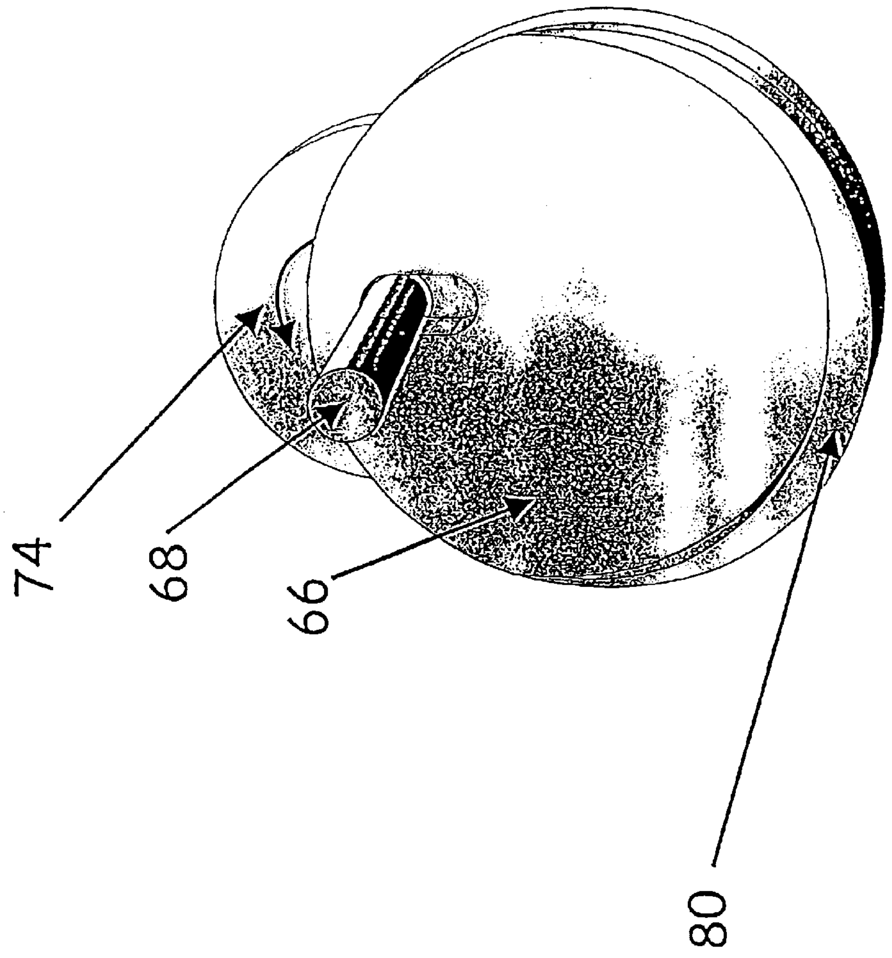
FIG. 14 is an end view of the second embodiment of the widened disc used in the crushing roller of the present invention.

Turning now to FIG. 13 and FIG. 14, a modified form of the discs 66 is shown. FIG. 13 is a side view of a set of crushing rollers of an embodiment of a disc having a widened edge. FIG. 14 is an end view of the second embodiment of the widened disc used in the crushing roller of the present invention. In particular, these discs 66 have widened edges 80.

The widened edges 80 are designed to reduce the distance between the discs 66 as can be seen in FIG. 12. In FIG. 13, the discs 66 have a widened edge 80 formed by a step. While the step does not completely encircle disc 66, it could if so desired. Moreover, this edge or a portion of it could be flared. However, such a flared edge would be harder to machine.

The discs in FIG. 13 and FIG. 14 are in the rest position, but would be rotated about an eccentric path similarly to the earlier described discs. The spacers 74 in the prior described embodiments will cause some spaces between the contact area of the disc 66 with the sheet media 12. In these spaces on the sheet media 12, the adhesives will not be activated. These widened or flared edges will increase the contact area of the disc 66 with the sheet media 12 and therefore increase the amount of ruptured encapsulated adhesives. If so desired, the spacers 74 can be omitted or of such a small size that the discs 66 will substantially work across the entire width or a majority of the width of the sheet media 12. As seen in FIG. 13, however, even when using spacers 74, the edges of the widened disc 66 almost touch so that a relatively large area of the width of the sheet media 12 will be engaged.

With any of the different described systems of the present invention, a method for rupturing an encapsulated adhesive contained in sheet media is provided. In this method, the sheet media 12 is provided. The sheet media 12 is then fed along the travel path 34. The sheet media will pass an activation device. This activation device includes the activation unit 24. In the activation unit 24, a pair of crushing rollers or a single crushing roller can be provided. An activator blade 28 can be provided to also rupture encapsulated adhesives or to just simply smear the already ruptured adhesives on the sheet media.

Alternatively, it is also possible to simply use the activator blade 28 alone as the unit for rupturing the encapsulated adhesives. As described above with reference to the embodiments beginning with FIG. 5, a series of rotatable discs 66 an also be used as the activation device. Either a single set of discs or a plurality of sets of discs can be utilized. With either of these arrangements, an activator blade 28 can be used or omitted as described above. After the sheet media is passed against the activation device 24, the encapsulated adhesives of the sheet media will be ruptured as has been described above.

A release liner device is used in any of the aforementioned embodiments to carry an activated adhesive side of a label media through desired process steps, e.g. a printer assembly, die cutting or heat treatment process. The release liner device can be used to transport a label media having an activated adhesive side that has either been formed through activated, e.g. ruptured, encapsulated adhesive or precoated label media. The release liner device can be any device that provides a transporting media or endless belt for laminating with an adhesive side of a label media.

The system and method of the present invention mass produces a series of labels or sheets, which have an adhesive ready for use. The adhesive can be precoated in an already activated state. Alternatively, and in a preferred embodiment, the activating unit 24 reliably and consistently provides for a useable adhesive by rupturing microencapsulated adhesives provided in sheet media 12.

The aforementioned system and method eliminate the need for the disposable liner material of the background art in pressure sensitive label applications. The present invention also allows for the combination of the benefits of linerless label media and encapsulated adhesive label media in a single low cost system that is relatively easy to maintain. Expensive release coatings on all of the related rollers and contact surfaces are also unnecessary as the release roller device accurately controls the desired positioning of activated adhesive sides of label media.

The present invention also reduces the need to invest in new labeler equipment to run linerless or encapsulated adhesive label media, as relatively easy retrofitting of existing equipment with the aforementioned systems of the present invention is a low cost alternative. Existing, proven label application technology can be used that simply incorporate the release liner device of the present invention into systems that have already earned market acceptance. Further, encapsulated adhesive activation equipment can be added on to existing label equipment as an accessory or retrofit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for transporting a sheet media having an at least one adhesive side, comprising the steps of:

providing a sheet media having the at least one adhesive side;

feeding the sheet media along a travel path;

passing the sheet media against an activation device;

rupturing the encapsulated adhesive with a shearing action as the sheet media moves past the activation device;

laminating the at least one adhesive side of the sheet media with a release liner device; and transporting the sheet media to a subsequent process step with said release liner device.

2. The method according to claim 1, wherein said release liner device is an endless belt.

3. The method as recited in claim 1, further comprising the step of printing indicia on the sheet media.

4. The method as recited in claim 1, further comprising the step of using sheet media with indicia printed on at least one surface thereof.

5. A method for transporting a sheet media having an at least one adhesive side, comprising the steps of:

providing a sheet media having the at least one adhesive side;

feeding the sheet media along a travel path;

passing the sheet media against an activation device;

rupturing the encapsulated adhesive as the sheet media moves past the activation device;

laminating the at least one adhesive side of the sheet media with a release liner device; and transporting the sheet media to a subsequent process step with said release liner device, wherein said release liner device is a roll of releasable sheet media.

6. A method for transporting a sheet media having an at least one adhesive side, comprising the steps of:

providing a sheet media having the at least one adhesive side;

feeding the sheet media along a travel path;

passing the sheet media against an activation device;

rupturing the encapsulated adhesive as the sheet media moves past the activation device;

laminating the at least one adhesive side of the sheet media with a release liner device; and transporting the sheet media to a subsequent process step with said release liner device, wherein the activation device includes an activator blade and wherein the method further comprises the step of spreading the adhesive after rupture thereof with the activator blade.

7. The method according to claim 6, wherein the activation device further comprises at least one crushing roller, the crushing roller being located upstream from the activator blade and wherein the method further comprises the step of sequentially engaging the sheet media with the at least one crushing roller and the activator blade.

8. The method according to claim 7, wherein the step of feeding the sheet media moves the sheet media at a first speed and the method further comprises the step of moving the at least one crushing roller at a second speed, the first speed being different from the second speed.

9. The method as recited in claim 6, wherein the activation device includes at least one crushing roller, the method further comprises the step of rotating the at least one crushing roller about an axis.

10. A system for handling an adhesive coated sheet media, comprising:

a feeder for the sheet media;

an activation device for releasing an encapsulated adhesive with a shearing action as sheet media is moved past the activation device by the feeder; and a release liner device for laminating with at least one adhesive side of the sheet media and transporting the sheet media through a travel path.

11. The system according to claim 10, further comprising:

a cutter for cutting the sheet media; and a label applicator, the label applicator being downstream from the cutter.

12. The system according to claim 10, wherein the release liner device is an endless belt.

13. The system according to claim 10, wherein the release liner device includes at least one surface having a releasable, non-stick surface.

14. The system according to claim 10, wherein the travel path includes a process device, said process device including a printer assembly, a die cutting assembly or a label activation assembly in a position opposed to said release liner device, said travel path for said sheet media passing between said process device and said release liner device.

15. A system for handling an adhesive coated sheet media, comprising:

a feeder for the sheet media;

an activation device for releasing an encapsulated adhesive as sheet media is moved past the activation device by the feeder; and a release liner device for laminating with at least one adhesive side of the sheet media and transporting the sheet media through a travel path, wherein the activation device includes an activator blade adjacent to the travel path, the activator blade being fixed in position relative to the travel path.

16. The system according to claim 15, further comprising a support surface adjacent the activator blade, the travel path passing between the activator blade and the support surface.

17. The system according to claim 15, wherein the support surface is a roller.

18. The system according to claim 15, wherein the activator blade extends across at least half of a widthwise direction of the sheet media.

19. The system as recited in claim 15, wherein the blade is at a fixed angle relative to the travel path.

20. The system as recited in claim 19, wherein the fixed angle is an acute angle between the activator blade and an upstream position of the sheet media.

21. The system as recited in claim 15, further comprising a printer, the printer being located downstream of the activation device and being adjacent to the travel path.

22. The system as recited in claim 15, further comprising a printer, the printer being located upstream of the activation device and being adjacent to the travel path.

23. A system for handling an adhesive coated sheet media, comprising:

a feeder for the sheet media;

an activation device for releasing an encapsulated adhesive as sheet media is moved past the activation device by the feeder; and a release liner device for laminating with at least one adhesive side of the sheet media and transporting the sheet media through a travel path a cutter for cutting the sheet media;

a label applicator, the label applicator being downstream from the cutter; and a printer for placing indicia on the sheet material, the activation device being located between the printer and the cutter.

24. A system for handling an adhesive coated sheet media, comprising:

a feeder for the sheet media;

an activation device for releasing an encapsulated adhesive with a shearing action as sheet media is moved past the activation device by the feeder; and a release liner device for laminating with at least one adhesive side of the sheet media and transporting the sheet media through a travel path, wherein the activation device includes at least one crushing roller for rupturing and thereby releasing the encapsulated media.

25. A system for handling an adhesive coated sheet media, comprising:

a feeder for the sheet media;

an activation device for releasing an encapsulated adhesive as sheet media is moved past the activation device by the feeder; and a release liner device for laminating with at least one adhesive side of the sheet media and transporting the sheet media through a travel path, wherein the activation device includes at least one crushing roller for rupturing and thereby releasing the encapsulated media, wherein the activation device further includes an activator blade past which the feeder moves the sheet media along a travel path, the activator blade being fixed in position relative to the path of the sheet media.

26. A system for handling an adhesive coated sheet media, comprising:

a feeder for the sheet media;

an activation device for releasing an encapsulated adhesive as sheet media is moved past the activation device by the feeder; and a release liner device for laminating with at least one adhesive side of the sheet media and transporting the sheet media through a travel path, wherein the activation device includes a plurality of rollers movable relative to an axle, wherein the rollers non-simultaneously contact the sheet media whereby different portions of the sheet media in a widthwise direction thereof are engaged by the rollers.

27. The system as recited in claim 26, further comprising a plurality of spacers, the spacers being located between the rollers.

28. The system as recited in claim 27, wherein at least some of the rollers have flared edges that overlie an adjacent spacer.

29. A system for handling an adhesive coated sheet media, comprising:

a feeder for the sheet media;

an activation device for releasing an encapsulated adhesive as sheet media is moved past the activation device by the feeder; and a release liner device for laminating with at least one adhesive side of the sheet media and transporting the sheet media through a travel path, wherein the release liner device is at least one roll of releasable sheet media.

30. A system for handling an adhesive coated sheet media, comprising:

a feeder for the sheet media;

an activation device for releasing an encapsulated adhesive as sheet media is moved past the activation device by the feeder;

a release liner device for laminating with at least one adhesive side of the sheet media and transporting the sheet media through a travel path; and a stripper plate downstream of said release liner device with respect to said travel path.

* * * * *